United States Patent
Kato et al.

(10) Patent No.: US 8,289,913 B2
(45) Date of Patent: Oct. 16, 2012

(54) BASE STATION DEVICE, MOBILE STATION DEVICE, WIRELESS COMMUNICATION SYSTEM, PROGRAM, RANDOM ACCESS RESPONSE TRANSMITTING METHOD, AND RANDOM ACCESS RESPONSE RECEIVING METHOD

(75) Inventors: Yasuyuki Kato, Osaka (JP); Shohei Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 411 days.

(21) Appl. No.: 12/663,902

(22) PCT Filed: Jun. 12, 2008

(86) PCT No.: PCT/JP2008/060760
§ 371 (c)(1),
(2), (4) Date: Dec. 10, 2009

(87) PCT Pub. No.: WO2008/153095
PCT Pub. Date: Dec. 18, 2008

(65) Prior Publication Data
US 2010/0165943 A1 Jul. 1, 2010

(30) Foreign Application Priority Data
Jun. 15, 2007 (JP) ................................. 2007-159150

(51) Int. Cl.
*H04W 74/00* (2009.01)
(52) U.S. Cl. ......... 370/329; 370/431; 370/465; 455/450
(58) Field of Classification Search ........................ None
See application file for complete search history.

(56) References Cited

U.S. PATENT DOCUMENTS
6,657,988 B2  12/2003  Toskala et al.
(Continued)

FOREIGN PATENT DOCUMENTS
EP   2101538 A2   9/2009
(Continued)

OTHER PUBLICATIONS

3GPP RP-070494 "Update on Mobility, Security, Random Access Procedure, etc."; Change Request CR0002rev1 version 8.0.0; 3GPP TSG-RAN Meeting #36; Jun. 1, 2007, pp. 1-46.*

(Continued)

*Primary Examiner* — Robert Scheibel
(74) *Attorney, Agent, or Firm* — Birch, Stewart, Kolasch & Birch, LLP

(57) ABSTRACT

A base station device includes: a random access identification information storage that stores random access identification information and mobile station device identification information correlated with the random access identification information, the random access identification information being allocated by the base station device to the mobile station device, and the mobile station device identification information identifying the mobile station device; a random access receiver that receives random access identification information transmitted by the mobile station device performing random access; a scheduler that, if the random access identification information received is stored in the random access identification information storage while being correlated with the mobile station device identification information, determines whether to transmit random access response information that is a response to the random access corresponding to the random access identification information received by using the mobile station device identification information, or by using identification information having not been allocated to a specific mobile station device, the identification information being allocated for transmitting the response to the random access; and a transmitter that allocates and transmits the random access response information based on the determination by the scheduler.

9 Claims, 9 Drawing Sheets

U.S. PATENT DOCUMENTS

| | | | |
|---|---|---|---|
| 7,873,005 B2 | 1/2011 | Ahn et al. | |
| 2007/0206531 A1 | 9/2007 | Pajukoski et al. | |
| 2008/0273610 A1* | 11/2008 | Malladi et al. | 375/260 |
| 2008/0310396 A1 | 12/2008 | Park et al. | |
| 2009/0111445 A1 | 4/2009 | Ratasuk et al. | |
| 2009/0201891 A1 | 8/2009 | Lee et al. | |
| 2009/0203323 A1 | 8/2009 | Ratasuk et al. | |
| 2009/0300457 A1 | 12/2009 | Kuo | |
| 2009/0323607 A1* | 12/2009 | Park et al. | 370/329 |
| 2010/0020786 A1 | 1/2010 | Futaki et al. | |
| 2010/0034158 A1 | 2/2010 | Meylan | |
| 2010/0088580 A1* | 4/2010 | Chun et al. | 714/807 |
| 2010/0111067 A1 | 5/2010 | Wu | |
| 2010/0118777 A1* | 5/2010 | Yamada et al. | 370/328 |
| 2010/0182992 A1 | 7/2010 | Chun et al. | |
| 2010/0254356 A1 | 10/2010 | Tynderfeldt et al. | |
| 2010/0284376 A1 | 11/2010 | Park et al. | |
| 2010/0290407 A1 | 11/2010 | Uemura | |
| 2011/0002262 A1 | 1/2011 | Wang et al. | |

FOREIGN PATENT DOCUMENTS

| | | |
|---|---|---|
| EP | 2144476 A2 | 1/2010 |
| JP | 2009-247023 A | 10/2009 |
| WO | WO 2004/077919 A2 | 9/2004 |

OTHER PUBLICATIONS

Extended European Search Report, dated Oct. 6, 2011, for European Application No. 11006472.2.

3GPP TR 25.814, 3rd Generation Partnership Project; Technical Specification Group Radio Access Network; Physical layer aspects for evolved Universal Terrestrial Radio Access (UTRA) (Release 7), pp. 1-132.

ETSI TS 136 300, V8.1.0 (Jun. 2007), "Universal Mobile Telecommunications System (UMTS) . . . ", pp. 1-108.

LG Electronics: "Discussion on Timing Advance Maintenance," 3GPP TSG-RAN WG2 #58 bis, Jun. 25-29, 2007, Orlando, USA, R2-072738, pp. 1-4.

LG Electronics: "Uplink resource request for uplink scheduling," 3GPP TSG RAN WG1 #44 bis, RI-060922, pp. 1-4.

Ericsson, "Initial, Random Access and Identity Handling", TSG-RAN WG2 Meeting #51 Tdoc R2-060592, 3GPP, Feb. 13-17, 2006, pp. 1-7.

IPWirelesss, "RACH access procedure(s) in E-UTRAN", 3GPP TSG-RAN WG2 #57, Feb. 16, 2007, R2-070645, pp. 1-3, URL, <http://www.3gpp.org/ftp/tsg_ran/WG2_RL2/TSGR2_57/Documents/R2-070645.zip>.

LG Electronics. "LTE Random Access Use Cases", 3GPP TSG RAN WG2 Meeting #52 R2-060890, 3GPP, Feb. 13-17, 2006, pp. 1-5.

NTT DoCoMo, Inc. rapporteur, "Summary of email discussion point 3: Initial access procedure: C-RNTI and HARQ", 3GPP TSG-RAN WG2 #56bis, Jan. 15-19, 2007, R2-070263, pp. 1-9, URL, <http://ftp.3gpp.org/tsg_ran/WG2_RL2/TSGR2_56bis/Documents/R2-070263.zip>.

NTT DoCoMo, Inc., "Uplink Synchronization", 3GPP TSG RAN WG2 #52 R2-063401, 3GPP, Nov. 6-10, 2006, pp. 1-3.

Search Report issued Feb. 1, 2010 in Eurasian Patent Application No. 200901107.

Search Report issued Jan. 28, 2010 in Eurasian Patent Application No. 200970753.

Sharp, "RA-RNTI vs. C-RNTI for non-contention based random access", 3GPP TSG-RAN WG2 #58bis, Jun. 29, 2007, R2-072379, 1 page, URL, <http://www.3gpp.org/ftp/tsg_ran/WG2_RL2/TSGR2_58bis/Docs/R2-072379.zip>.

NTT DoCoMo, Inc., "Text proposal on random access procedures", 3GPP TSG RAN WG2 #57bis, Draft R2-071562, 3GPP, Mar. 26-30, 2007, p. 1-4, St. Julian's, Malta.

3GPP TS 36.211, V1.10, May 2007, Technical Specification Group Radio Access Network, Physical Channels and Modulation, (Release 8).

3GPP TS 36.212, V1.20, May 2007, Technical Specification Group Radio Access Network, Multiplexing and channel coding, (Release 8).

R2-072338, "Update on Mobility, Security, Random Access Procedure, etc . . . " 3GPP TSG-RAN WG2 Meeting #58, May 7-11, 2007, Kobe, Japan.

Extended European Search Report in European Application No. 09011153.5 mailed Jan. 10, 2011.

* cited by examiner

BASE STATION DEVICE, MOBILE STATION DEVICE, WIRELESS COMMUNICATION SYSTEM, PROGRAM, RANDOM ACCESS RESPONSE TRANSMITTING METHOD, AND RANDOM ACCESS RESPONSE RECEIVING METHOD

TECHNICAL FIELD

The present invention relates to a base station device, a mobile station device, a wireless communication system, a program, a random access response transmitting method, and a random access response receiving method. Particularly, the present invention relates to a base station device, a mobile station device, a wireless communication system, a program, a random access response transmitting method, and a random access response receiving method for random access in an uplink.

Priority is claimed on Japanese Patent Application No. 2007-159150, filed Jun. 15, 2007, the content of which is incorporated herein by reference.

BACKGROUND ART

W-CDMA has been standardized as a third generation cellular mobile communication scheme by 3GPP (3rd Generation Partnership Project), and services thereof have been sequentially provided. Further, HSDPA (High Speed Downlink Packet Access), which is a faster communication scheme, has been also standardized, and services thereof are about to be provided.

On the other hand, evolved universal terrestrial radio access (hereinafter, "EUTRA") has been considered by 3GPP. OFDM (Orthogonal Frequency Division Multiplexing) has been considered as an EUTRA downlink. Additionally, DFT (Discrete Fourier Transform)-spread OFDM, which is a single-carrier communication scheme, has been considered as an EUTRA uplink.

FIG. 7 illustrates an EUTRA uplink and downlink channel configuration. An EUTRA downlink includes a DPiCH (Downlink Pilot Channel), a DSCH (Downlink Synchronization Channel), a PDSCH (Physical Downlink Shared Channel), a PDCCH (Physical Downlink Control Channel), and a CCPCH (Common Control Physical Channel).

An EUTRA uplink includes a UPiCH (Uplink Pilot Channel), an RACH (Random Access Channel), a PUSCH (Physical Uplink Shared Channel), and a PUCCH (Physical Uplink Control Channel) (see Non-Patent Documents 1 and 2).

FIG. 8 illustrates an example of an uplink radio resource configuration. In FIG. 8, horizontal and vertical axes denote time and frequency, respectively. FIG. 8 shows the configuration of one radio frame, and the radio frame is divided into multiple resource blocks. In this example, a resource block is a unit region defined by 1.5 MHz in the frequency direction and 1 ms in the time direction. RACHs, PUSCHs, and PUCCHs explained in FIG. 7 are allocated to the regions as shown.

In other words, a dot-hatched region, a non-hatched region, and a cross-hatched region denote resource blocks to which an RACH, a PUSCH, and a PUCCH are allocated, respectively.

An E-UTRA uplink RACH includes an asynchronous random access channel and a synchronous random access channel. The asynchronous random access channel uses the 1.25 MHz band as a minimum unit. A base station device prepares multiple random access channels for accesses from multiple mobile station devices. A main intended use of an asynchronous random access channel is to synchronize a base station device and mobile station devices. Additionally, a connection time can be reduced by transmitting a few bits of data, such as a scheduling request for radio resource allocation, using an asynchronous random access channel. An intended use of a synchronous random access is to transmit a scheduling request (see Non-Patent Document 2).

Asynchronous random access includes contention-based random access and non-contention-based random access. The contention-based random access is normal random access that might cause a contention among mobile station devices. The non-contention-based random access is random access that does not cause a contention among mobile station devices, and is performed under control of the base station device in a special case, such as a handover, for quickly synchronizing the base station device and mobile station devices.

In the asynchronous random access, only a preamble is transmitted for synchronization. This is called a random access preamble. This preamble includes a signature that is a signal pattern indicative of information. Several ten signatures are prepared, from which some signature is selected to express several bits of data. Currently, 6 bits of data is transmitted by a signature in EUTRA. For the 6 bits of data, 2 to the 6th power (i.e., 64) signatures are prepared.

A random ID is allocated to 5 bits of the 6 bits of the signature, and any one of random access reason, downlink path-loss/CQI (Channel Quality Indicator), and the like is allocated to the remaining 1 bit (see Non-Patent Document 3).

FIG. 9 is a procedure example of contention-based random access that is asynchronous random access. Firstly, a mobile station device selects a signature based on a random ID, downlink pass-loss/CQI information, or the like, and transmits a random access preamble on an asynchronous random access channel (message Ma1). Upon receiving the preamble from the mobile station device, the base station device calculates a synchronization timing shift between the mobile station device and the base station device based on the preamble to generate synchronization shift information. Additionally, the base station device performs scheduling for transmitting an L2/L3 (Layer 2/Layer 3) message to generate scheduling information and to assign a cell-radio network temporary identity (hereinafter, "temporary C-RNTI").

The base station device allocates, to a PDCCH, an RA-RNTI (Random Access-Radio Network Temporary Identity) indicating that a random access response to the mobile station device having transmitted the preamble on the random access channel is allocated to the PDSCH. Further, the base station device transmits a random access response including the synchronization timing-shift information, scheduling information, the temporary C-RNTI, and the signature ID number (or random ID) of the received preamble in the resource block of the PDSCH on which the random access response allocation has been indicated by the RA-RNTI (message Ma2). The RA-RNTI is a specific value not used as the C-RNTI. The mobile station device detects the specific value, and thereby detects that the random access response is allocated to the PDSCH.

FIG. 10 is an example of a random access response allocated to a PDSCH when the allocation is indicated by an RA-RNTI. As shown in FIG. 10, if a random access response allocation is indicated by the RA-RNTI, random access response messages corresponding to multiple mobile station devices (n devices in the case of FIG. 10), each including synchronization timing-shift information, scheduling information, a temporary C-RNTI, and the signature ID number of the received preamble, can be included in one resource block of the PDSCH.

Upon confirming that the RA-RNTI is included in the PDCCH, the mobile station device confirms the information included in the random access responses included in the PDSCH. Then, the mobile station device extracts a response including the signature ID number (or random ID) of the transmitted preamble, and corrects the synchronization timing shift based on the synchronization timing shift information included in the extracted response. Then, based on the received scheduling information, the mobile station device transmits an L2/L3 message including at least the C-RNTI (or the temporary C-RNTI) in the scheduled resource block (message Ma3). Upon receiving the L2/L3 message from the mobile station device, the base station device transmits, to the mobile station device, a contention resolution for determining whether or not a contention among mobile station devices is occurring by using the C-RNTI (or temporary C-RNTI) included in the received L2/L3 message (message Ma4) (see Non-Patent Document 3).

FIG. 11 is an example of a procedure of non-contention-based random access that is asynchronous random access. Firstly, the base station device selects the signature ID number, and indicates a preamble assignment to the mobile station device on the PDSCH (message Mb1). The mobile station device transmits a random access preamble on an asynchronous random access channel by using the indicated signature ID number (message Mb2). Upon receiving the random access preamble from the mobile station device, the base station device calculates a synchronization timing shift between the mobile station device and the base station device based on the preamble. Then, the base station device allocates an RA-RNTI or a C-RNTI indicative of a response to the mobile station device to the PDCCH, and transmits a random access response including the synchronization timing-shift information on the PDSCH (message Mb3). The mobile station device corrects the synchronization timing shift based on the received random access response (see Non-Patent Document 3).

[Non-Patent Document 1] 3GPP TS (Technical Specification) 36.211, V1.10 (2007-05), Technical Specification Group Radio Access Network, Physical Channel and Modulation (Release 8)

[Non-Patent Document 2] 3GPP TS (Technical Specification) 36.212, V1.20 (2007-05), Technical Specification Group Radio Access Network, Multiplexing and channel coding (Release 8)

[Non-Patent Document 3] R2-072338 "Update on Mobility, Security, Random Access Procedure, etc," 3GPP TSG RAN WG2 Meeting #58, Kobe, Japan, 7-11 May 2007

DISCLOSURE OF THE INVENTION

Problems to be Solved by the Invention

The present inventors found that there is a selection whether a random access response (message Mb3) to non-contention-based random access that is asynchronous random access is indicated from the base station device to the mobile station device by using an RA-RNTI or a C-RNTI.

In the case of using the C-RNTI, a retransmission process HARQ (Hybrid Acknowledgement Repeat reQuest) used for normal data transmission can be performed since this case is similar to the normal data transmission. Therefore, there is a merit in that the reliability of the random access response message increases. Since the C-RNTI is identification information concerning the mobile station device, there is another merit in that it can be quickly determined that the random access response is addressed to the mobile station device. However, there is a problem in that only the amount of the synchronization timing shift information occupies one resource block of the PDSCH.

On the other hand, in the case of using the RA-RNTI, there is a merit in that the usability of the PDSCH is better since one resource block of the PDSCH can be shared by multiple mobile station devices. However, there is a problem in that the retransmission process HARQ cannot be performed since one resource block is shared by multiple mobile station devices. Therefore, there is a problem in that the reliability of data is smaller than the case of using the C-RNTI.

Additionally, it cannot be determined whether or not the random access response is addressed to the mobile station device only by referring to the RA-RNTI until information included in the PDSCH is confirmed. Therefore, there is a problem in that it is time consuming for the mobile station device.

Problems to be solved are that efficient transmission and reception of a random access response message is to be performed.

Means for Solving the Problems

A base station device of the present invention performs wireless communication with a mobile station device. The base station includes: a random access identification information storage that stores random access identification information and mobile station device identification information correlated with the random access identification information, the random access identification information being allocated by the base station device to the mobile station device, and the mobile station device identification information identifying the mobile station device; a random access receiver that receives random access identification information transmitted by the mobile station device performing random access; a scheduler that, if the random access identification information received is stored in the random access identification information storage while being correlated with the mobile station device identification information, determines whether to transmit random access response information that is a response to the random access corresponding to the random access identification information received by using the mobile station device identification information, or by using identification information having not been allocated to a specific mobile station device, the identification information being allocated for transmitting the response to the random access; and a transmitter that allocates and transmits the random access response information based on the determination by the scheduler.

In the base station device, if the random access identification information received is stored in the random access identification information storage while being correlated with the mobile station device identification information, the scheduler may determine, based on an amount of downlink traffic, whether to transmit the random access response information by using the mobile station device identification information or by using the identification information.

In the base station device, if the random access identification information received is stored in the random access identification information storage while being correlated with the mobile station device identification information, the scheduler may determine, based on the number of pieces of random access response information to be simultaneously transmitted, whether to transmit the random access response information by using the mobile station device identification information or by using the identification information.

In the base station device, if the number of pieces of random access response information to be simultaneously transmitted which is divided by the number of pieces of random access response information that can be allocated in one random access response leaves a remainder of 1, the scheduler may use the mobile station device identification information allocated to the mobile station device that is a destination for transmitting one of the pieces of random access response information which is the response to the random access corresponding to the random access identification information stored in the random access identification information storage, and may use the identification information for transmitting remaining pieces of the pieces of random access response information.

A mobile station device of the present invention performs wireless communication with a base station device. The mobile station device includes: a random access identification information storage that stores random access identification information identifying random access to be transmitted by the mobile station device; a transmitter that transmits, by performing random access, the random access identification information stored in the random access identification information storage or random access identification information determined by the mobile station device; and a random access response receiver that, if the transmitter transmits the random access identification information determined by the mobile station device, detects identification information having not been allocated to a specific mobile station device, the identification information being allocated for transmitting a random access response, and extracts random access response information addressed to the mobile station device from the random access response corresponding to the identification information detected, and if the transmitter transmits the random access identification information stored in the random access identification information storage, detects any one of the identification information and mobile station device identification information allocated to the mobile station device, and extracts random access response information addressed to the mobile station device from the random access response corresponding to the identification information detected.

A wireless communication system of the present invention includes a mobile station device and a base station device that performs wireless communication with the mobile station device. The mobile station device includes: a first random access identification information storage that stores random access identification information identifying random access to be transmitted by the mobile station device; a transmitter that transmits, by performing random access, any one of the random access identification information stored in the first random access identification information storage and random access identification information determined by the mobile station device; and a random access response receiver that, if the transmitter transmits the random access identification information determined by the mobile station device, detects identification information allocated for transmitting a random access response, the identification information having not been allocated to a specific mobile station device, and extracts random access response information addressed to the mobile station device from the random access response corresponding to the identification information detected, and if the transmitter transmits the random access identification information stored in the first random access identification information storage, detects any one of identification information and mobile station device identification information allocated to the mobile station device, and extracts random access response information addressed to the mobile station device from the random access response corresponding to the identification information detected. The base station device includes: a second random access identification information storage that stores random access identification information and mobile station device identification information correlated with the random access identification information, the random access identification information being allocated by the base station device to the mobile station device, and the mobile station device identification information identifying the mobile station device; a random access receiver that receives random access identification information transmitted by the mobile station device performing random access; a scheduler that, if the random access identification information received is stored in the random access identification information storage while being correlated with the mobile station device identification information, determines whether to transmit random access response information that is a response to the random access corresponding to the random access identification information received by using the mobile station device identification information, or by using identification information having not been allocated to a specific mobile station device, the identification information being allocated for transmitting the response to the random access; and a transmitter that allocates and transmits the random access response information based on the determination by the scheduler.

A program of the present invention makes a computer function as, the computer being included in a base station device that performs wireless communication with a mobile station device, the base station device including a random access identification information storage that stores random access identification information and mobile station device identification information correlated with the random access identification information, the random access identification information being allocated by the base station device to the mobile station device, and the mobile station device identification information identifying the mobile station device: a random access receiver that receives random access identification information transmitted by the mobile station device performing random access; a scheduler that, if the random access identification information received is stored in the random access identification information storage while being correlated with the mobile station device identification information, determines whether to transmit random access response information that is a response to the random access corresponding to the random access identification information received by using the mobile station device identification information, or by using identification information having not been allocated to a specific mobile station device, the identification information being allocated for transmitting the response to the random access; and a transmitter that allocates and transmits the random access response information based on the determination by the scheduler.

A program of the present invention makes a computer function as, the computer being included in a mobile station device that performs wireless communication with a base station device, the mobile station device including a random access identification information storage that stores random access identification information identifying random access to be transmitted by the mobile station device: a transmitter that transmits, by performing random access, the random access identification information stored in the random access identification information storage or random access identification information determined by the mobile station device; and a random access response receiver that, if the transmitter transmits the random access identification information determined by the mobile station device, detects identification information allocated for transmitting a random access response, the identification information having not been allocated to a specific mobile station device, and extracts random access response information addressed to the mobile station device from the random access response corresponding to the identification information detected, and if the transmitter transmits the random access identification information stored in the random access identification information storage, detects any one of the identification information and mobile station device identification information allocated to the mobile station device, and extracts random access response information addressed to the mobile station device from the random access response corresponding to the identification information detected.

A random access response transmitting method of the present invention is provided for a base station device that performs wireless communication with a mobile station device, the base station device including a random access identification information storage that stores random access identification information and mobile station device identification information correlated with the random access identification information, the random access identification information being allocated by the base station device to the mobile station device, and the mobile station device identification information identifying the mobile station device. The random access response transmitting method includes: a first step of the base station device receiving random access identification information transmitted by the mobile station device performing random access; a second step of the base station device, if the random access identification information received is stored in the random access identification information storage while being correlated with the mobile station device identification information, determining whether to transmit random access response information that is a response to the random access corresponding to the random access identification information received by using the mobile station device identification information, or by using identification information having not been allocated to a specific mobile station device, the identification information being allocated for transmitting the response to the random access; and a third step of the base station device allocating and transmitting the random access response information based on the determination in the second step.

A random access response receiving method of the present invention is provided for a mobile station device that performs wireless communication with a base station device, the mobile station device including a random access identification information storage that stores random access identification information identifying random access to be transmitted by the mobile station device. The random access response receiving method includes: a first step of the mobile station device transmitting, by performing random access, any one of the random access identification information stored in the random access identification information storage and random access identification information determined by the mobile station device; and a second step of, if the mobile station device transmits the random access identification information determined by the mobile station device in the first step, detecting identification information having not been allocated to a specific mobile station device, the identification information being allocated for transmitting a random access response, and extracting random access response information addressed to the mobile station device from the random access response corresponding to the identification information detected, and if the mobile station device transmits the random access identification information stored in the random access identification information storage in the first step, detecting any one of the identification information and the mobile station device identification information allocated to the mobile station device, and extracting random access response information addressed to the mobile station device from the random access response corresponding to the identification information detected.

Effects of the Invention

The base station device of the present invention has a merit in that the base station device transmits each random response information piece by using identification information allocated for transmitting the random access response, thereby increasing the transmission efficiency. Further, the base station device uses the mobile station device identification information corresponding to random access identification information if one random access response information piece occupies one random access response. Therefore, retransmission of the random access response information is enabled, thereby increasing the reliability, and therefore enabling efficient reception and transmission of random access response information.

Figure 1:
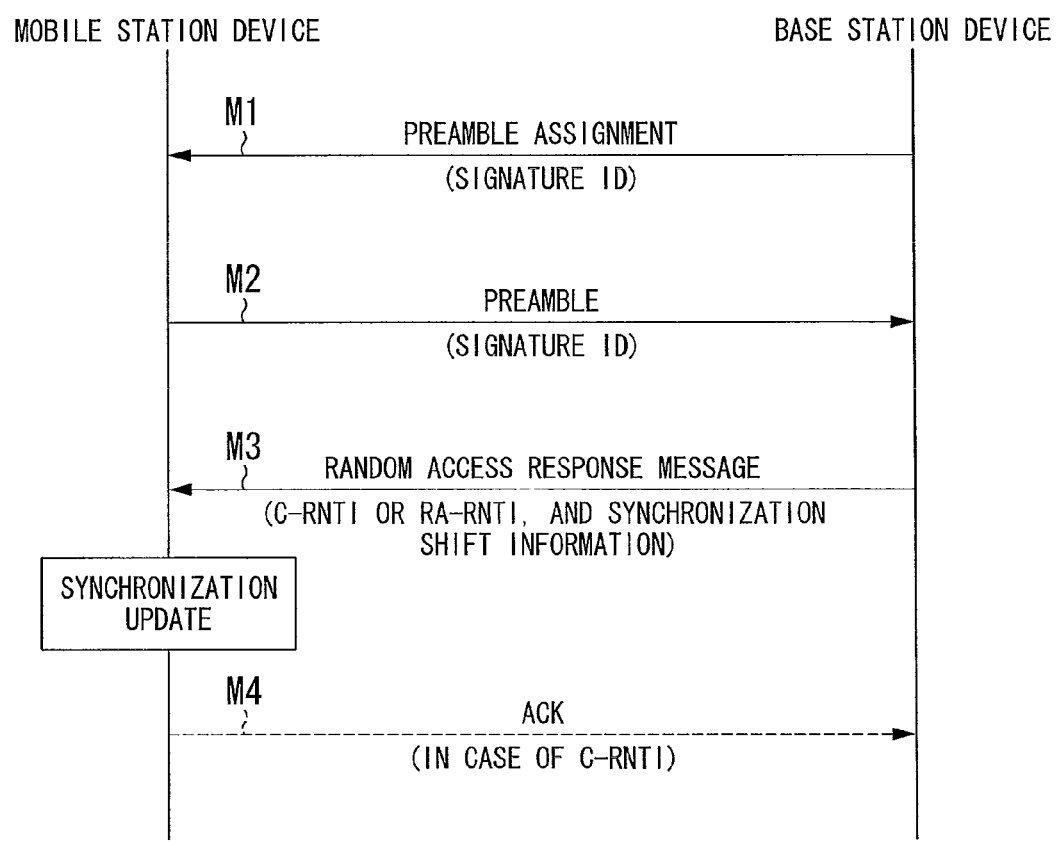
FIG. 1 is a sequence chart illustrating a random access operation performed by a wireless communication system according to an embodiment of the present invention.

| Description of Reference Numerals | |
|---|---|
| 10 | base station device |
| 11 | data controller |
| 12 | OFDM modulator |
| 13 | scheduler |
| 14 | channel estimator |
| 15 | DFT-S-OFDM demodulator |
| 16 | control data extractor |
| 17 | preamble detector |

-continued

Description of Reference Numerals

| | |
|---|---|
| 18 | radio unit |
| 19 | signature ID number storage |
| 20 | transmitter |
| 21 | DL scheduler |
| 22 | UL scheduler |
| 23 | message generator |
| 31 | C-RNTI detector |
| 32 | RA-RNTI detector |
| 33 | C-RNTI-RA-RNTI detector |
| 34 | detector switcher |
| 35 | extractor |
| 50 | mobile station device |
| 51 | data controller |
| 52 | DFT-S-OFDM modulator |
| 53 | scheduler |
| 54 | OFDM demodulator |
| 55 | channel estimator |
| 56 | control data extractor |
| 57 | synchronization corrector |
| 58 | preamble generator |
| 59 | signature selector |
| 60 | radio unit |
| 61 | signature ID number storage |
| 70 | transmitter |

BEST MODE FOR CARRYING OUT THE INVENTION

Hereinafter, an embodiment of the present invention is explained with reference to the accompanying drawings. Similar to the EUTRA, a wireless communication system according to the embodiment includes a base station device and multiple mobile station devices. In the embodiment, a communication connection from the mobile station device to the base station device is called an "uplink," and a communication connection from the base station device to the mobile station device is called a "downlink." The downlink of the embodiment includes a DPiCH, a DSCH, a PDSCH, a PDCCH, and a CCPCH. The uplink of the embodiment includes a UPiCH, an RACH, a PUSCH, and a PUCCH.

In the embodiment, a wireless resource is divided into resource blocks each defined by 1.25 MHz in the frequency direction and 1 ms in the time direction, as explained above. The base station device performs scheduling to allocate these resource blocks to the mobile station devices, and performs wireless communication with each of the mobile station devices. However, when uplink timing synchronization is lost, the mobile station device performs transmission to the base station device using an RACH while being allocated no resource block.

Since OFDMA and DFT-S-OFDM are used for downlink and uplink communication schemes in the embodiment, respectively, the resource block is divided along the frequency and time directions. However, if the communication scheme is TDMA (Time Division Multiple Access), the resource block is divided along the time direction. If the communication scheme is FDMA (Frequency Division Multiple Access), the resource block is divided along the frequency direction. If the communication scheme is CDMA (Code Division Multiple Access), the resource block is divided by spread codes.

The RACH of the embodiment includes an asynchronous random access channel and a synchronous access channel. The asynchronous random access channel is for synchronizing the mobile station device and the base station device. The synchronous random access is for requesting scheduling.

Further, the asynchronous random access includes contention-based random access and non-contention-based random access. The contention-based random access is random access that might cause a contention among the mobile station devices since each mobile station device determines the signature ID number to be transmitted.

The non-contention-based random access is random access causing no contention among the mobile station devices since each mobile station device transmits the signature ID number specified by the base station device. The signature ID numbers to be used for non-contention-based random access are predetermined, and not used for contention-based random access. Therefore, whether it is contention-based random access or non-contention-based random access can be determined by referring to the signature ID number.

FIG. 1 is a sequence chart illustrating uplink timing synchronization using non-contention-based random access. When the base station device has a mobile station device perform non-contention-based random access, the base station device indicates a preamble assignment including the signature ID number to the target mobile station device (M1). Upon receiving the preamble assignment, the mobile station device transmits a preamble including the signature ID number specified by the preamble assignment transmitted from the base station device (M2).

The base station device detects the preamble transmitted from the mobile station device. The preamble is a signal pattern corresponding to the signature ID number. The base station device detects a preamble by detecting, from reception signals, a signal corresponding to the signal pattern corresponding to the signature ID number. At the same time, the base station device determines the number of mobile station devices having performed non-contention-based random access based on the preamble. Based on the determination result, the base station device determines whether to transmit a random access response message (random access response information) by using a C-RNTI, an RA-RNTI, or both a C-RNTI and an RA-RNTI. Based on the determination result, the base station device transmits a random access response message to each mobile station device (M3).

If the C-RNTI is used and an ACK signal for the random access response message has not been received, the base station device performs retransmission of the random access response message up to the maximum HARQ retransmission number of times. On the other hand, the mobile station device having performed the non-contention-based random access (i.e., the mobile station device having transmitted the preamble) monitors both the C-RNTI and the RA-RNTI. If the random access response message is received, the mobile station device corrects uplink synchronization. If the random access response message is received by the C-RNTI, the mobile station device returns an ACK signal to the base station device (M4).

The transmission by using C-RNTI indicates that a random access response message is transmitted by being allocated to a resource block assigned using C-RNTI to each mobile station device in communication with the base station device, which is a resource block assigned to the specific mobile station device. The C-RNTI used in this case is mobile station device identification information C-RNTI managed by the base station device while the C-RNTI is correlated with the signature ID number of the preamble received in the sequence M2. Thus, only the mobile station device corresponding to the C-RNTI and having transmitted in the sequence M2 the preamble including the signature ID number managed by the base station device correlated with the C-RNTI can receive the C-RNTI in the sequence M3 and obtain the random access response message stored in the resource block allocated by the C-RNTI.

On the other hand, the transmission by using RA-RNTI indicates that a random access response message is transmitted by being allocated to a resource block specified using the RA-RNTI assigned for a response to the mobile station device having performed the random access, which is a resource block assigned for transmitting a random access response. By transmission by using the RA-RNTI, the mobile station device having transmitted the preamble receives the RA-RNTI, and then obtains one of the random access messages included in the resource block allocated by the RA-RNTI, the one of the random access messages including the signature ID number identical to the one transmitted by the mobile station device. Thus, the mobile station device can receive a random access response message with respect to the preamble transmitted by the mobile station device.

Therefore, the base station device has to know the relationship between the signature ID numbers and the mobile station devices to perform transmission by using C-RNTI. Therefore, transmission by using C-RNTI can be used only for non-contention-based random access. On the other hand, the base station device does not have to know the relationship between the signature ID numbers and the mobile station devices to perform transmission by using RA-RNTI. Therefore, transmission by using RA-RNTI can be used for both non-contention-based random access and contention-based random access.

Figure 2:
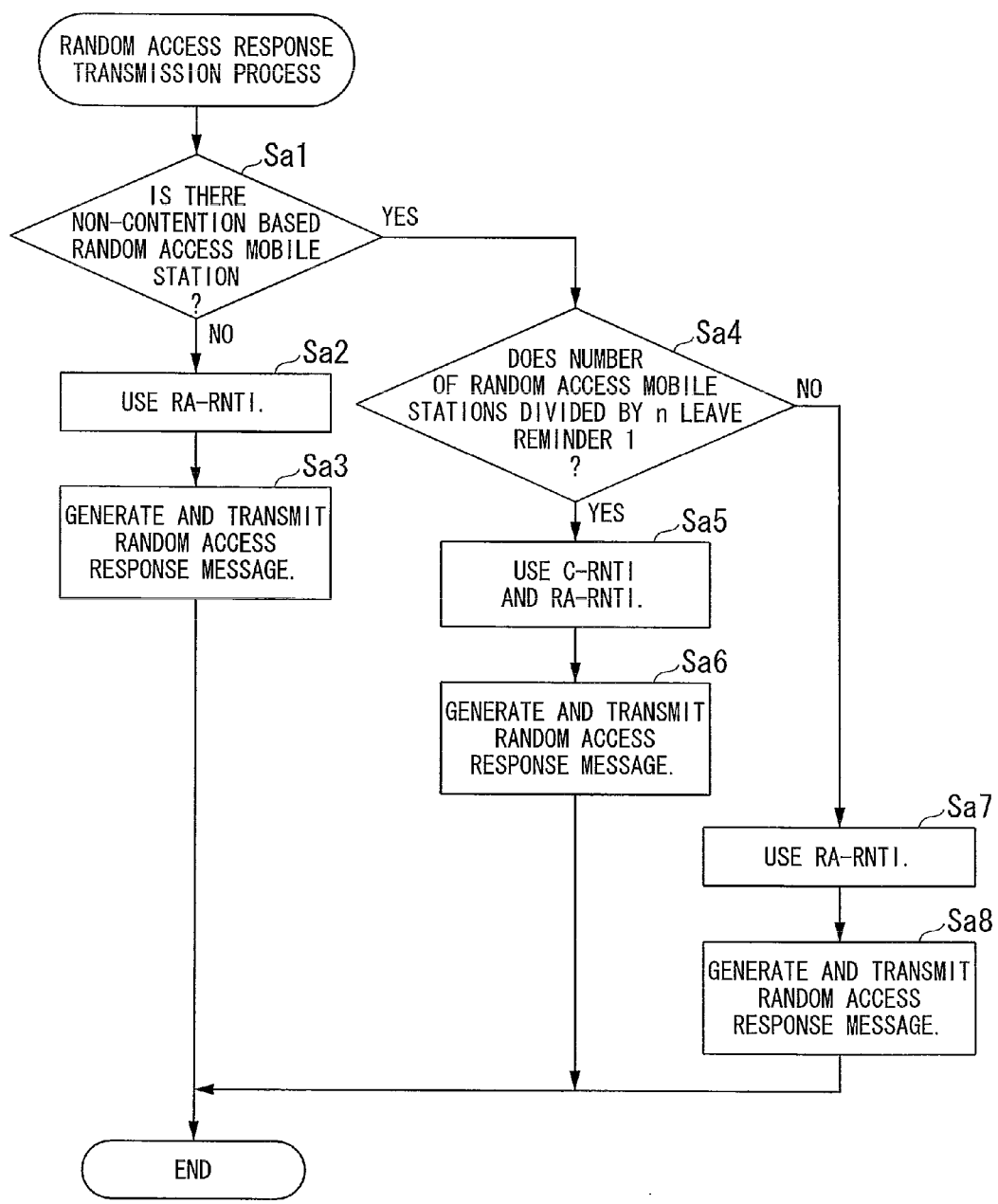
FIG. 2 is a flowchart illustrating an operation performed by a base station device according to the embodiment.

FIG. 2 is a flowchart illustrating an operation performed by the base station device. Upon receiving a preamble, the base station device determines whether or not the signature ID number of non-contention-based random access is included in the signature ID numbers included in the received preamble. By the determination, the base station device determines whether or not there is a mobile station device having transmitted non-contention-based random access (Sa1). If there is no mobile station device having transmitted the signature ID number of non-contention-based random access (Sa1-NO), the base station device determines that the RA-RNTI is used for a random access response (Sa2), and generates a random access response message in a resource block specified by the RA-RNTI. Then, the base station device transmits the generated random response message to the mobile station device (Sa3).

On the other hand, if it is determined in step Sa1 that there is the signature ID number of non-contention-based random access, i.e., there is a mobile station device having transmitted non-contention-based random access (Sa1-YES), it is determined whether or not the number of mobile station devices having performed random access (i.e., mobile station devices to which random access response messages are to be transmitted), if divided by n, leaves a remainder "1" (Sa4). If it is determined that the reminder is "1" (Sa4-YES), the base station device determines to transmit, by using C-RNTI, a random access response message with respect to one of the non-contention-based random access preambles and to transmit the remaining ones by using RA-RNTI (Sa5). The base station device generates a random access response message based on the determination in the step Sa5 (Sa6).

On the other hand, if it is determined in the step Sa4 that the number of mobile station devices having performed random access divided by n does not leave a remainder "1" (Sa4-NO), the base station device determines to assign RA-RNTI (Sa7). Then, the base station device generates a random access response message (Sa8). n is the maximum number of random access response messages that can be included in one resource block.

Here, C-RNTI and RA-RNTI are assigned based on the number of mobile station devices having performed random access. In consideration of the amount of downlink traffic, however, the RA-RNTI by which multiple random access response messages can be included in one resource block may be preferentially assigned when the amount of downlink traffic is large, i.e., when the number of resource blocks in which random access response messages can be transmitted is small. For, if there are multiple mobile station devices having performed non-contention-based random access and C-RNTI is used, the same number of resource blocks as that of the mobile station devices having performed non-contention based random access is necessary, and therefore resource blocks run short in some cases. When the amount of downlink traffic is small, i.e., when the number of resource blocks in which random access response messages can be transmitted is large, the C-RNTI may be preferentially assigned to increase the reliability of random access response messages. For, the reliability of random access response messages is smaller in the case of using the RA-RNTI than in the case of using the C-RNTI.

Figure 3:
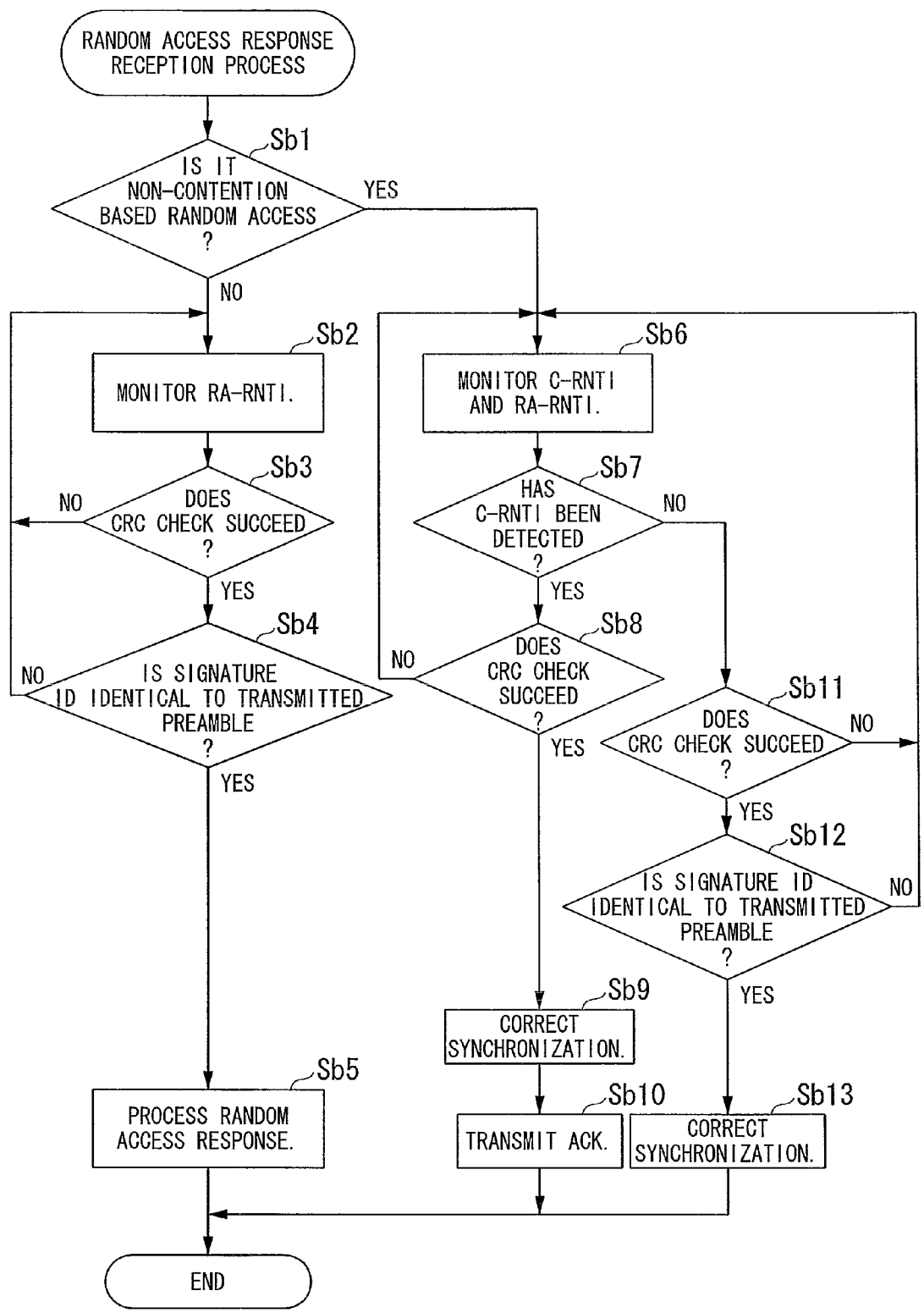
FIG. 3 is a flowchart illustrating an operation performed by a mobile station device according to the embodiment.

FIG. 3 is a flowchart illustrating an operation performed by the mobile station device. After transmitting a preamble of asynchronous random access, the mobile station device monitors the downlink to receive a random access response message from the base station device. Firstly, the mobile station device determines whether or not the random access performed by the mobile station device is non-contention-based random access (Sb1). If it is determined in step Sb1 that the random access is not non-contention-based random access (Sb1-NO), the mobile station device monitors an RA-RNTI (Sb2). If an RA-RNTI is not detected for a given period, or if an RA-RNTI is detected, but does not include the signature ID number (or random ID) transmitted by the mobile station device, time runs out. The mobile station device performs random access again (this path is not shown).

Upon detecting RA-RNTI, the mobile station device performs CRC (Cyclic Redundancy Check) of the PDSCH allocated to the resource block specified by the RA-RNTI, and determines success or failure of the CRC (Sb3). If the CRC check is determined to be failure (Sb3-NO), the routine returns to step Sb2, and the mobile station device monitors an RA-RNTI again. On the other hand, if the CRC is determined to be success (Sb3-YES), the mobile station device determines whether or not the signature ID number identical to that included in the preamble transmitted by the mobile station device is included in the PDSCH with respect to which the CRC check has succeeded (Sb4).

If it is determined in step Sb4 that the signature ID number identical to that transmitted by the mobile station device is included (Sb4-YES), the mobile station device obtains a random access response message as well as the signature ID number from the PDSCH, and processes the obtained items (i.e., the mobile station device corrects uplink synchronization based on synchronization timing shift information, generates an L2/L3 message, and transmits the L2/L3 message) (Sb5). On the other hand, if it is determined in step Sb4 that the signature ID number identical to that transmitted by the mobile station device is not included (Sb4-NO), the routine returns to step Sb2, and the mobile station device monitors an RA-RNTI (this path is not shown).

On the other hand, if it is determined in step Sb1 that the random access performed by the mobile station device is non-contention-based random access (Sb1-YES), the mobile station device monitors a C-RNTI and an RA-RNTI (Sb6). If a C-RNTI and an RA-RNTI are not detected for a given time or if an RA-RNTI is detected, but does not include the signature ID number (or random ID) transmitted by the mobile station device, time runs out. Then, the mobile station device performs random access again.

If a C-RNTI is detected (Sb7-YES), the mobile station device performs CRC of PDSCH allocated to the resource block specified by the detected C-RNTI, and determines success or failure of the CRC (Sb8). If the CRC is determined to be failure in step Sb8 (Sb8-NO), the routine returns to step Sb6, and the mobile station device monitors a C-RNTI and an RA-RNTI again. On the other hand, if the CRC is determined to be success in step Sb8 (Sb8-YES), the mobile station device corrects synchronization based on synchronization timing shift information (Sb9), and transmits an ACK signal (acknowledgement confirmation signal) to the base station device (Sb10).

If not a C-RNTI, but an RA-RNTI is detected in step Sb7 (Sb7-NO), the mobile station device performs CRC of the PDSCH allocated to the resource block specified by the detected RA-RNTI. If the CRC fails (Sb1-NO), the routine returns to step Sb6, and the mobile station device monitors a C-RNTI and an RA-RNTI again. On the other hand, if the CRC succeeds in step Sb11 (Sb11-YES), the mobile station device determines whether or not the signature ID number identical to that transmitted by the mobile station device is included in the PDSCH with respect to which the CRC is performed (Sb12).

If it is determined in step Sb12 that the signature ID number identical to that transmitted by the mobile station device is included (Sb12-YES), the mobile station device obtains a random access response message as well as the signature ID number from the PDSCH, and corrects synchronization based on the synchronization timing shift information extracted from the random access response message (Sb13). On the other hand, if it is determined in step Sb12 that the signature ID number identical to that transmitted by the mobile station device is not included (Sb12-NO), the routine returns to step Sb6, and the mobile station device monitors a C-RNTI and an RA-RNTI.

Figure 4:
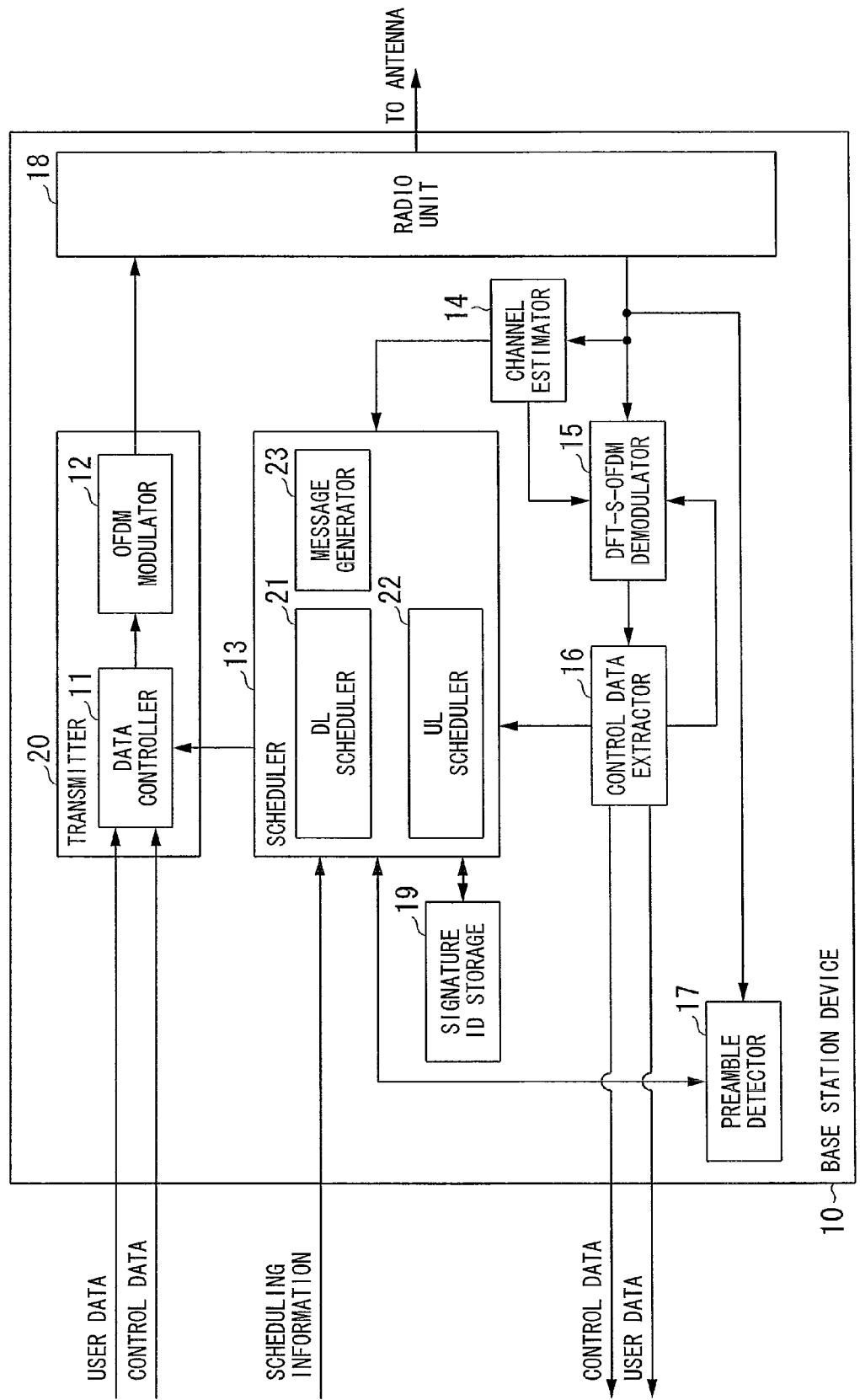
FIG. 4 is a schematic block diagram illustrating a configuration of the base station device according to the embodiment.

FIG. 4 is a schematic block diagram illustrating a configuration of the base station device 10. The base station device 10 includes a data controller 11, an OFDM modulator 12, a scheduler 13, a channel estimator 14, a DFT-S-OFDM (DFT-spread OFDM) demodulator 15, a control data extractor 16, a preamble detector 17, a radio unit 18, and a signature ID number storage 19. The scheduler 13 includes a DL scheduler 21, an UL scheduler 22, and a message generator 23.

According to an instruction from the scheduler 13, the data controller 11 maps received control data to the DPiCH, the DSCH, the PDCCH, and the CCPCH. Further, the data controller 11 maps received user data (including the random access response and the preamble assignment) with respect to each mobile station device to the PDSCH.

The OFDM modulator 12 performs, on the user data and the control data mapped to the respective channels, OFDM signal processing, such as data modulation, serial/parallel conversion, IFFT (Inverse Fast Fourier Transform), CP (Cyclic Prefix) insertion, and filtering, to generate an OFDM signal.

The radio unit 18 upconverts the OFDM signal into a radio frequency signal, and transmits the upconverted signal to the mobile station device through an antenna (not shown). In the embodiment, the data controller 11 and the OFDM controller 12 forms the transmitter 20.

The radio unit 18 receives an uplink signal from the mobile station device through the antenna. Then, the radio unit 18 downconverts the received signal into a baseband signal. Then, the radio unit 18 outputs the baseband signal to the DFT-S-OFDM demodulator 15, the channel estimator 14, and the preamble detector 17. The channel estimator 14 estimates radio channel characteristics from the UPiCH included in the baseband signal, and outputs the radio channel estimation result to the DFT-S-OFDM demodulator 15. The channel estimator 14 outputs the radio channel estimation result to the scheduler 13 for uplink scheduling using the UPiCH. The DFT-S-OFDM demodulator 15 demodulates the baseband signal based on the radio channel estimation result and an instruction from the control data extractor 16 to generate reception data. Although DFT-spread OFDM that is a single-carrier scheme is used as an uplink communication scheme in the embodiment, a multi-carrier scheme, such as OFDM, may be used.

The control data extractor 16 confirms whether or not the reception data has errors, and outputs the confirmation result to the scheduler 13. If the reception data has no error, the control data extractor 16 divides the reception data into user data and control data. The control data extractor 16 outputs, to the scheduler 13, layer-2 control data included in the control data, such as downlink CQI information, ACK/NACK of downlink data, and a resource allocation request. Further, the control data extractor 16 outputs other layer-3 control data and user data to an upper layer. If the reception data has errors, the control data extractor 16 stores the reception data to be synthesized with retransmission data, and perform synthesis processing upon receiving retransmission data.

The preamble detector (random access receiver) 17 detects a preamble from the baseband signal, and calculates an amount of synchronization timing shift based on the preamble. Then, the preamble detector 17 reports the signature ID number indicated by the preamble and the amount of synchronization timing shift to the scheduler 13. The signature ID number storage (random access identification information storage) 19 stores the C-RNTI (mobile station device identification information) of a mobile station device to which the preamble assignment is transmitted while the C-RNTI is correlated with the signature ID number (random access identification information) specified by the preamble assignment.

The scheduler 13 includes a DL scheduler 21 for performing downlink scheduling and an UL scheduler 22 for performing uplink scheduling, and a message generator 23. The DL scheduler 21 performs scheduling for mapping user data to each downlink channel based on the CQI information indicated by the mobile station device, user data information indicated from the upper layer, and the control data generated by the message generator. The scheduling includes determination of whether or not to transmit each random access response message explained in FIG. 2 by using the C-RNTI or the RA-RNTI. When transmitting the random access response message by using the C-RNTI, the DL scheduler 21 uses, as a value of the C-RNTI, a value of the C-RNTI stored in the signature ID number storage correlated with the signature ID number of the preamble received from the mobile station device.

The UL scheduler 22 performs scheduling for mapping user data to each uplink channel based on the radio channel estimation result received from the channel estimator 14 and the resource allocation request from the mobile station device divided by the control data extractor 16.

The message generator 23 generates control data, such as ACK/NACK of uplink data, a random access response message, and a preamble assignment. Upon generating a preamble assignment, the message generator 23 stores the C-RNTI of the mobile station device to which the preamble assignment is transmitted while the C-RNTI is correlated with the signature ID number specified by the preamble assignment. Upon generating a random access response message, the message generator 23 stores synchronization timing shift information indicative of the amount of synchronization timing shift received from the preamble detector 17 and the signature ID number into the random access response message.

Figure 5:
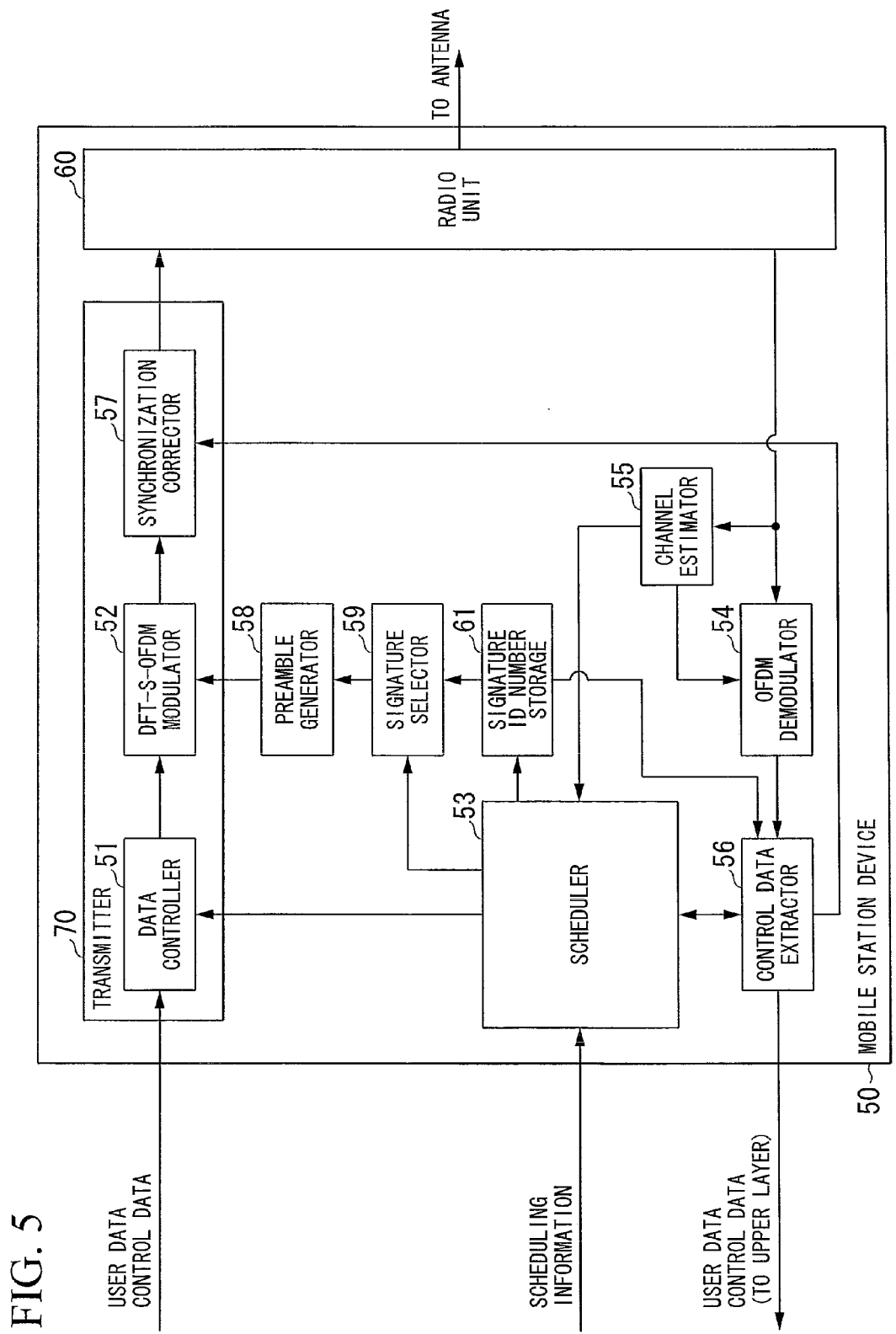
FIG. 5 is a schematic block diagram illustrating a configuration of the mobile station device according to the embodiment.

FIG. 5 is a schematic block diagram illustrating a configuration of the mobile station device 50. The mobile station device 50 includes a data controller 51, a DFT-S-OFDM modulator 52, a scheduler 53, an OFDM demodulator 54, a channel estimator 55, a control data extractor 56, a synchronization corrector 57, a preamble generator 58, a signature selector 59, and a radio unit 60. According to an instruction from the scheduler 53, the data controller 51 allocates received user data and control data (including a preamble and ACK/NACK) to the RACH, the PUSCH, and the PUCCH. The data controller 51 allocates the preamble to the RACH, and the ACK/NACK to the PUCCH. Further, the data controller 51 allocates the UPiCH. The DFT-S-OFDM modulator 52 performs, on the user data and the control data allocated to the channels, DFT-S-OFDM signal processing, such as data modulation, DFT conversion, subcarrier mapping, IFFT, CP insertion, and filtering, to generate a DFT-S-OFDM signal.

The synchronization corrector 57 corrects transmission timing of the DFT-S-OFDM signal based on the synchronization timing shift information received from the control data extractor 56, and outputs the corrected signal to the radio unit 60. The radio unit 60 sets a radio frequency instructed by the radio controller (now shown) to the radio unit 60, and upconverts the DFT-S-OFDM signal into the set-radio frequency signal, and transmits the upconverted signal to the base station device through an antenna (not shown). The radio unit 60 receives a downlink signal from the base station device through the antenna, downconverts the received signal into a baseband signal, and outputs the downconverted signal to the OFDM demodulator 54 and the channel estimator 55. The channel estimator 55 estimates radio channel characteristics using the DPiCH included in the baseband signal, and outputs the estimation result to the OFDM demodulator 54. Additionally, the channel estimator 55 converts the estimation result into CQI information to indicate the radio channel estimation result to the base station device, and outputs the CQI information to the scheduler 53.

The OFDM demodulator 54 demodulates the baseband signal using the radio channel estimation result received from the channel estimator 55 to generate reception data. The control data extractor 56 divides the reception data into user data and control data. The control data extractor 56 outputs uplink synchronization timing shift information included in the control data to the synchronization corrector 57. Additionally, the control data extractor 56 outputs scheduling information and other layer-2 control data (including the preamble assignment) to the scheduler 53. Further, the control data extractor 56 outputs layer-3 control data and user data to an upper layer. Reception of a random access response message performed by the control data extractor 56 will be explained in detail with reference to FIG. 6. The scheduler 53 instructs the data controller 51 to map, to each uplink channel, data or control information based on the scheduling information received from the upper layer and the control data from the base station device.

Upon random access to the base station, the scheduler 53 instructs the signature selector 59 to perform random access, and indicates a reception scheme to the control data extractor 56. When the scheduler 53 instructs the signature selector 59 to perform random access, and if a preamble assignment has been received, that is, the signature ID number has been specified by the base station device, the scheduler 53 extracts the signature ID number from the preamble assignment. Then, the scheduler 53 stores the signature ID number in the signature ID number storage 61. At the same time, the scheduler 53 instructs the signature selector 59 to use the stored signature ID number. If a preamble assignment has not been received, the scheduler 53 instructs the signature selector 59 to select the signature ID number.

When the scheduler 53 indicates a reception scheme to the control data extractor 56, and if a preamble assignment has been received, the scheduler 53 instructs the control data extractor 56 to monitor a C-RNTI and an RA-RNTI to receive a random access response message. If a preamble assignment has not been received, that is, if the signature selector 59 selects the signature ID number, the scheduler 53 instructs the control data extractor 56 to monitor an RA-RNTI to receive a random access response message.

The signature selector 59 selects the signature ID number to be used for random access based on an instruction from the scheduler 53, and outputs the selected signature ID number to the preamble generator 58. If the signature selector 59 is instructed to use the signature ID number stored in the signature ID number storage 61, the signature selector 59 obtains the signature ID number from the signature ID number storage 61, and outputs the obtained signature ID number to the preamble generator. The preamble generator 58 generates a preamble including the signature ID number selected by the signature selector 59, and outputs the generated preamble to the DFT-S-OFDM modulator 52. The signature ID number storage (random access identification information storage) 61 receives, from the scheduler 53, the signature ID number extracted from the preamble assignment, and stores the received signature ID number.

Figure 6:
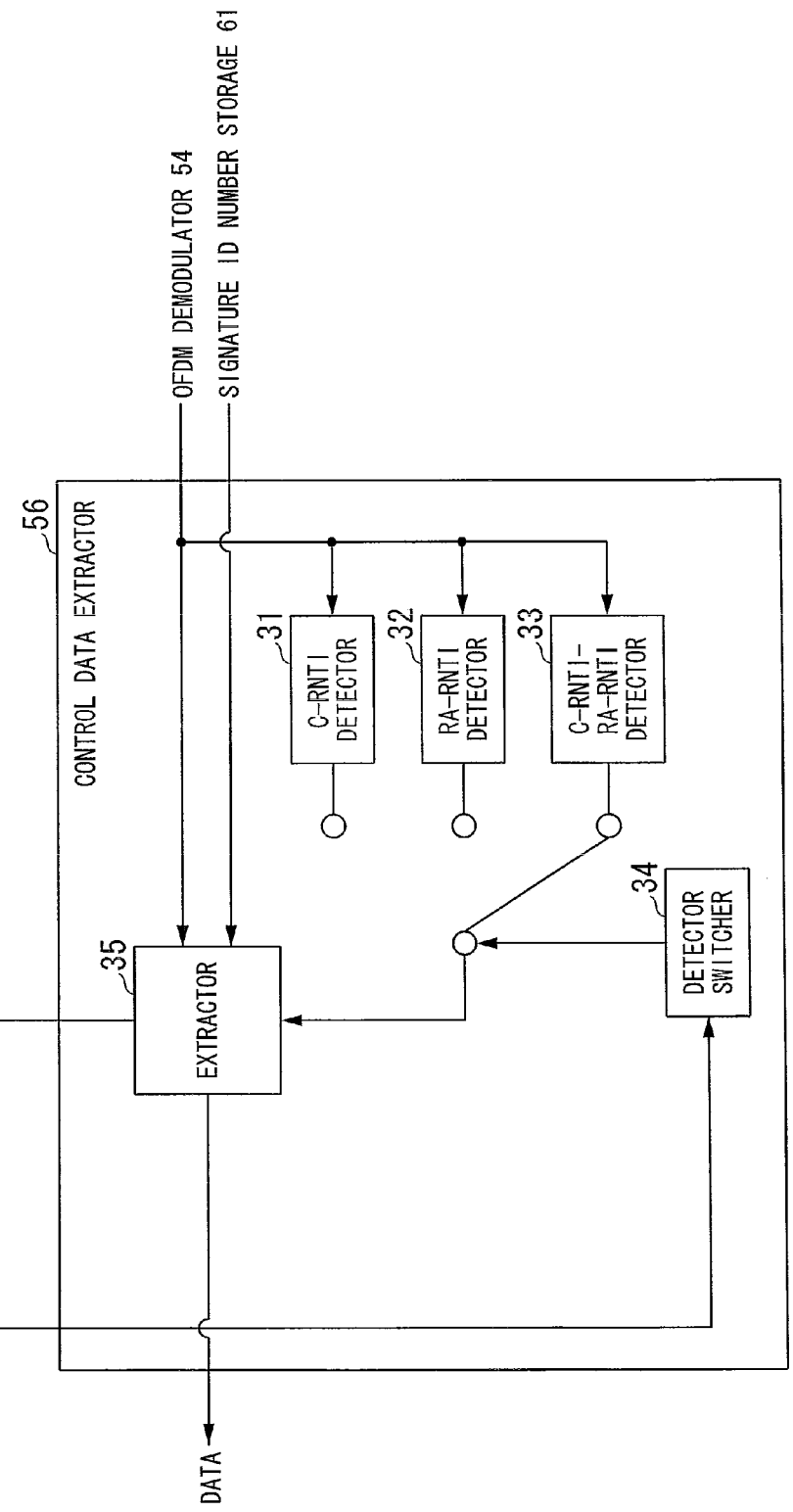
FIG. 6 is a schematic block diagram illustrating a configuration of a control data extractor 56 included in the mobile station device of the embodiment receiving a random access response message.
Figure 7:
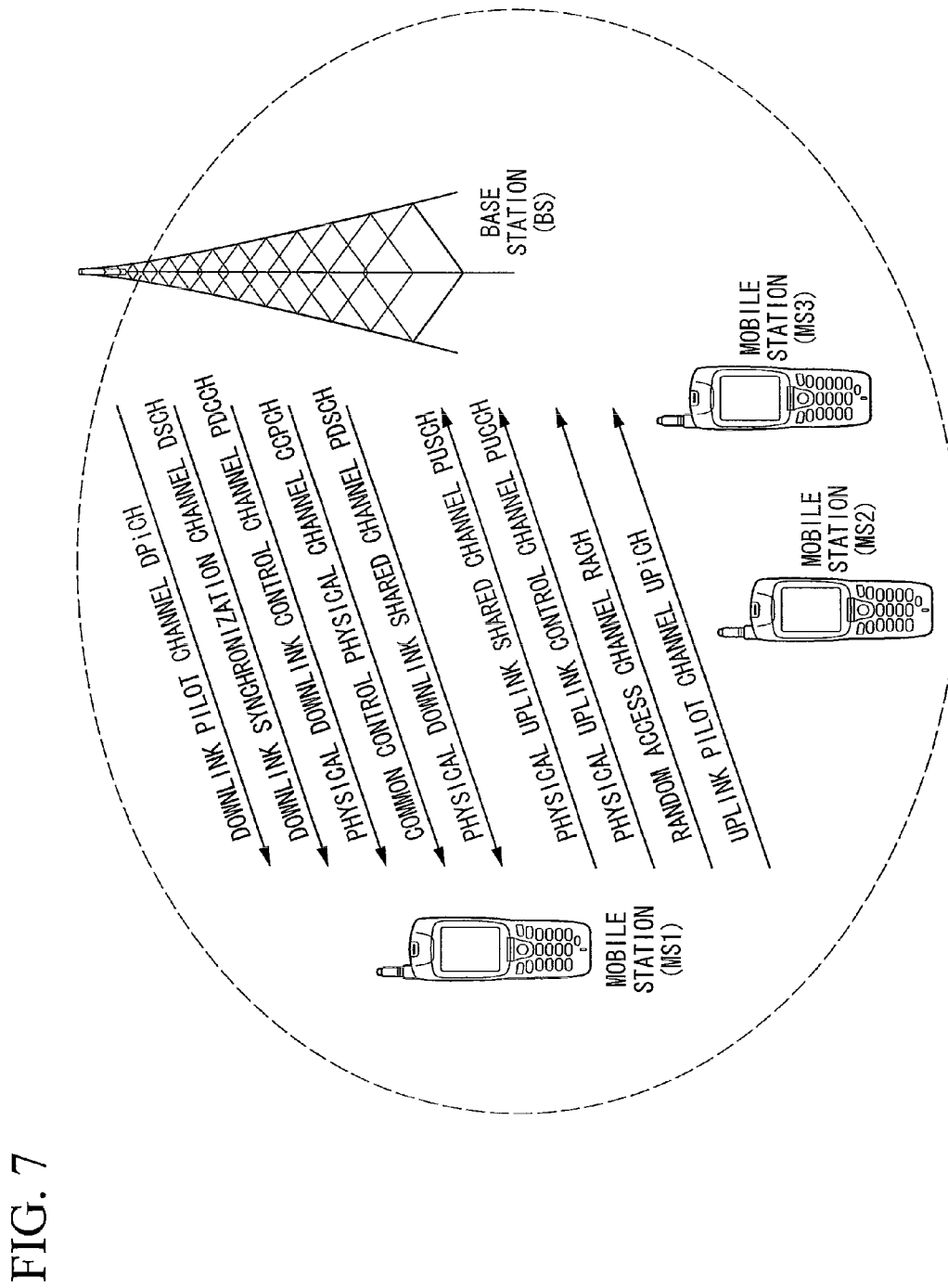
FIG. 7 illustrates an EUTRA uplink and downlink channel configuration.
Figure 8:
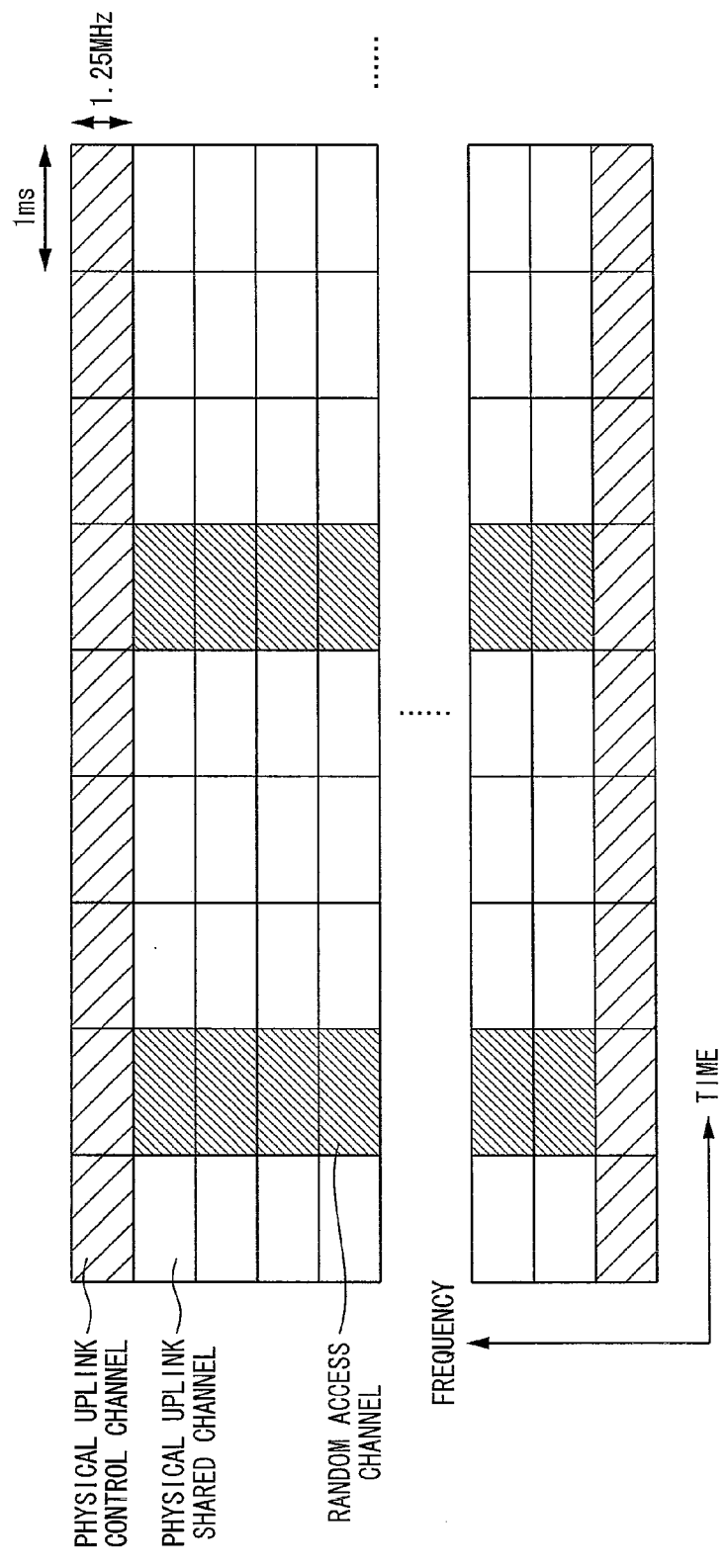
FIG. 8 illustrates an example of an EUTRA uplink wireless resource configuration.
Figure 9:
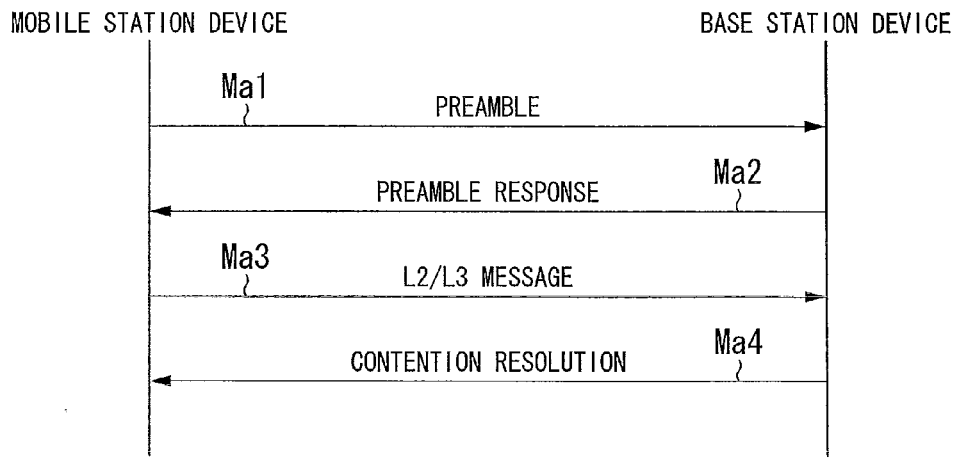
FIG. 9 illustrates an example of a procedure of contention-based random access that is asynchronous random access of EUTRA.
Figure 10:
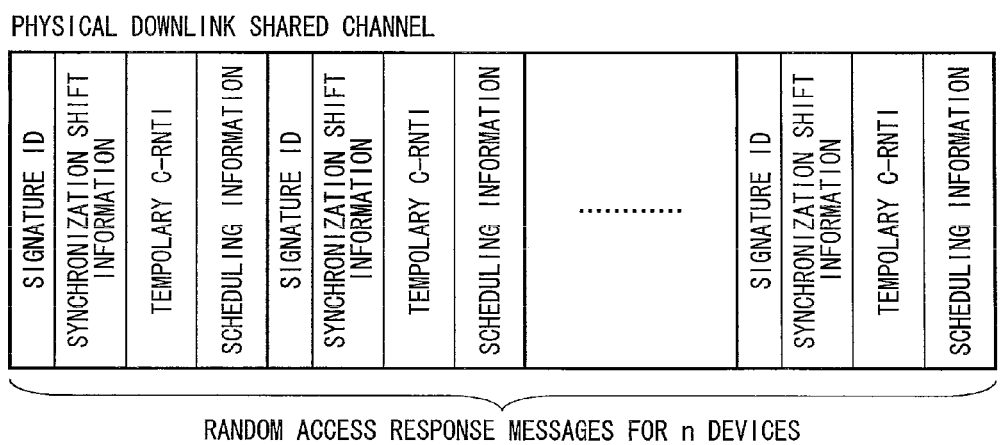
FIG. 10 illustrates an example of a random access response allocated to a PDSCH when the allocation is indicated by using an RA-RNTI in EUTRA.
Figure 11:
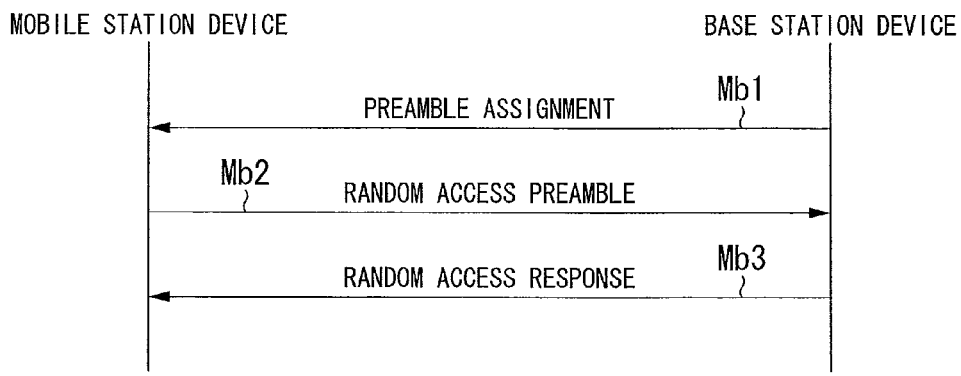
FIG. 11 illustrates an example of a procedure of non-contention based random access that is asynchronous random access of EUTRA.

FIG. 6 is a schematic block diagram illustrating a configuration of the control data extractor (random access response receiver) 56 of the mobile station device receiving a random access response message. The control data extractor 56 includes a C-RNTI detector 31, an RA-RNTI detector 32, a C-RNTI-RA-RNTI detector 33, a detector switcher 34, and an extractor 35. The C-RNTI detector 31 detects a C-RNTI assigned to the mobile station device in the PDCCH, extracts control information correlated with the C-RNTI from the PDCCH, and analyzes the control information to identify the resource block assigned to the mobile station device. The C-RNTI detector 31 outputs the analysis result to the extractor 35.

The RA-RNTI detector 32 detects an RA-RNTI from the PDCCH, extracts control information correlated with the RA-RNTI from the PDCCH, and analyzes the control information to identify the resource block assigned for the random access response. The RA-RNTI detector 32 having detected the RA-RNTI outputs the analysis result to the extractor 35.

The C-RNTI-RA-RNTI detector 33 detects a C-RNTI or an RA-RNTI assigned to the mobile station device in the PDCCH, extracts control information correlated with the C-RNTI or the RA-RNTI from the PDCCH, and analyzes the control information to identify the resource block assigned to the random access response. The C-RNTI-RA-RNTI detector 33 outputs the analysis result to the extractor 35.

The detector switcher 34 switches which one of outputs of the detectors 31 to 33 is input to the extractor 35.

Based on the analysis result of the control information that is one of the outputs of the detectors 31 to 33, the extractor 35 extracts data (including a random access response message) from the PDSCH in the resource block assigned to the mobile station device. Further, the extractor 35 extracts, from the PDSCH in the resource block assigned for a random access response, a random access response message corresponding to the signature ID number stored in the signature ID number storage 61. Then, the extractor 35 outputs control data (such as synchronization timing shift information) including the random access response message to the scheduler 35 and the synchronization corrector 57. Additionally, the extractor 35 outputs user data to the upper layer.

If the random access response message is transmitted by using the RA-RNTI in this manner, multiple random access response messages addressed to the multiple mobile station devices simultaneously having performed random access can be included in one resource block. If a random access response message is transmitted by using the C-RNTI, the procedure is the same as that of the normal downlink transmission of data. Therefore, retransmission processing (HARQ) can be used, thereby increasing the reliability of responses compared to the case of using RA-RNTI.

Accordingly, if the C-RNTI is used instead of the RA-RNTI for a response to only one mobile station device having performed non-contention-based random access, one resource block is used, and therefore the transmission efficiency is the same. Further, the HARQ can be used, thereby enabling an increase in the reliability of data. On the other hand, if the C-RNTI is used for responses to two to n mobile station devices having performed random access including non-contention-based random access (where n is the number of random access responses that can be included in one resource block of PDSCH in the case of using the RA-RNTI), PDSCHs corresponding to n resource blocks are required. However, if an RA-RNTI is used, only one resource of PDSCH is used, thereby increasing the usability of the PDSCH.

Multiple resource blocks are necessarily required for responses to n or more mobile station devices. For responses to (kn+1) mobile station devices (where k is an integer), one resource block has to be always used for one mobile station device. For this reason, the C-RNTI is used for a response to one mobile station device, and the RA-RNTI is used for the remaining mobile station devices. For responses to the (kn+2) to (k+1)×n mobile station devices, only the RA-RNTI is used since multiple responses to the multiple mobile station devices have to be included in one resource. Thus, both the RA-RNTI and the C-RNTI are used, thereby minimizing the number of resources used for PDSCHs, and therefore increasing the reliability of data and the efficiency. The RA-RNTI, the C-RNTI, both the RA-RNTI and the C-RNTI are selectively used according to the number of mobile station devices having performed random access, thereby enabling efficient reception and transmission of random access response messages.

The data controller 11, the OFDM modulator 12, the scheduler 13, the channel estimator 14, the DFT-S-OFDM demodulator 15, the control data extractor 16, and the preamble detector 17, which are shown in FIG. 4; and the data controller 51, the DFT-S-OFDM modulator 52, the scheduler 53, the OFDM demodulator 54, the channel estimator 55, the control data extractor 56, the synchronization corrector 57, the preamble generator 58, and the signature selector 59, which are shown in FIG. 5, may be implemented by storing a program for implementing functions of these units into a computer-readable recording medium, and making a computer system read and execute the program stored in the recording medium. The "computer system" includes an OS and hardware, such as peripheral devices.

Additionally, the "computer system" includes home page provision environments (or display environments) if a WWW system is used.

The "computer-readable recording medium" includes a portable medium, such as a flexible disk, an optical disc, an ROM, a CD-ROM, and the like, and a storage device such as a hard disk installed in a computer system. The "computer-readable recording medium" includes a medium dynamically storing a program for a short period, such as a communication line when a program is transmitted through a network such as the Internet or a communication line such as a telephone line. Additionally, the "computer-readable recording medium" includes a medium storing a program for a given period, such as volatile memory in a computer system of a server or a client in the above case. The program may be for implementing a part of the aforementioned functions or for implementing the aforementioned functions with a combination of the program and another program stored in the computer system.

Although the embodiment is explained with reference to the drawings, the specific configuration is not limited to the embodiment, and various modifications can be made without departing from the scope of the present invention.

INDUSTRIAL APPLICABILITY

The present invention is suitable to, but is not limited to, a cellular phone system including a cellular phone terminal as a mobile station device.

The invention claimed is:

1. A base station device that performs wireless communication with a mobile station device, the base station comprising:
   a random access identification information storage that is configured to store random access identification information and mobile station device identification information correlated with the random access identification information, wherein the random access identification information being allocated by the base station device to the mobile station device and the mobile station device identification information identifying the mobile station device;
   a random access receiver that is configured to receive random access identification information transmitted by the mobile station device having performed random access;
   a scheduler that is configured to determine whether to transmit random access response information that is a response to the random access corresponding to the random access identification information received from the mobile station device, by using the mobile station device identification information or by using identification information having not been allocated to a specific mobile station device and being allocated for transmitting the response to the random access in case that the random access identification information received is stored in the random access identification information storage while being correlated with the mobile station device identification information; and
   a transmitter that is configured to allocate and transmit the random access response information based on the determination by the scheduler,
   wherein the scheduler determines, based on an amount of downlink traffic, whether to transmit the random access response information by using the mobile station device identification information or by using the identification information having not been allocated to a specific mobile station device and being allocated for transmitting the response to the random access in case that the random access identification information received is stored in the random access identification information storage while being correlated with the mobile station device identification information.

2. A base station device that performs wireless communication with a mobile station device, the base station device comprising:
   a random access identification information storage that is configured to store random access identification information and mobile station device identification information correlated with the random access identification information, wherein the random access identification information being allocated by the base station device to the mobile station device and the mobile station device identification information identifying the mobile station device;
   a random access receiver that is configured to receive random access identification information transmitted by the mobile station device having performed random access;
   a scheduler that is configured to determine whether to transmit random access response information that is a response to the random access corresponding to the random access identification information received from the mobile station device, by using the mobile station device identification information or by using identification information having not been allocated to a specific mobile station device and being allocated for transmitting the response to the random access in case that the random access identification information received is stored in the random access identification information storage while being correlated with the mobile station device identification information; and
   a transmitter that is configured to allocate and transmit the random access response information based on the determination by the scheduler,
   wherein the scheduler determines, based on the number of pieces of random access response information to be simultaneously transmitted, whether to transmit the random access response information by using the mobile station device identification information or by using the identification information having not been allocated to a specific mobile station device and being allocated for transmitting the response to the random access in case that the random access identification information received is stored in the random access identification information storage while being correlated with the mobile station device identification information.

3. The base station device according to claim 2, wherein in case that the number of pieces of random access response information to be simultaneously transmitted which is divided by the number of pieces of random access response information that can be allocated in one random access response leaves a remainder of 1, the scheduler uses the mobile station device identification information allocated to the mobile station device that is a destination for transmitting one of the pieces of random access response information which is the response to the random access corresponding to the random access identification information stored in the random access identification information storage, and uses the identification information for transmitting remaining pieces of the pieces of random access response information.

4. A mobile station device that performs wireless communication with a base station device, the mobile station device comprising:
   a transmitter configured to transmit random access identification information; and
   a control data extractor configured to monitor identification information and mobile station device identification information in case that the mobile station device has transmitted, by performing random access, the random access identification information specified by the base station device, wherein
   the random access identification information being used for identifying the random access performed by the mobile station device,
   the identification information having not been allocated to a specific mobile station device and the identification information being allocated for transmitting a response to the random access performed by the mobile station device, and
   the mobile station device identification information being allocated to the mobile station device.

5. A wireless communication system, the wireless communication system comprising:
   a mobile station device; and
   a base station device configured to perform wireless communication with the mobile station device, wherein
   in case that the mobile station device has transmitted, by performing random access, random access identification information specified by the base station device, the mobile station device monitors identification information and mobile station device identification information,
   the random access identification information being used for identifying the random access performed by the mobile station device,
   the identification information having not been allocated to a specific mobile station device and the identification information being allocated for transmitting a response to the random access performed by the mobile station device, and
   the mobile station device identification information being allocated to the mobile station device, and
   the base station device comprises:
   a random access identification information storage that is configured to store random access identification information and mobile station device identification information correlated with the random access identification information, wherein the random access identification information being allocated by the base station device to the mobile station device and the mobile station device identification information identifying the mobile station device;
   a random access receiver that is configured to receive random access identification information transmitted by the mobile station device having performed random access;
   a scheduler that is configured to determine whether to transmit random access response information that is a response to the random access corresponding to the random access identification information received from the mobile station device, by using the mobile station device identification information or by using identification information having not been allocated to a specific mobile station device and being allocated for transmitting the response to the random access in case that the random access identification information received is stored in the random access identification information storage while being correlated with the mobile station device identification information; and a transmitter that that is configured to allocate and transmit the random access response information based on the determination by the scheduler.

6. A communication method for base station device, wherein the base station device performs wireless communication with a mobile station device, the communication method comprising:

storing random access identification information and mobile station device identification information correlated with the random access identification information, wherein the random access identification information being allocated by the base station device to the mobile station device and the mobile station device identification information identifying the mobile station device;

receiving random access identification information transmitted by the mobile station device having performed random access;

determining, based on an amount of downlink traffic, whether to transmit random access response information that is a response to the random access corresponding to the random access identification information received from the mobile station device by using the mobile station device identification information or by using identification information having not been allocated to a specific mobile station device and being allocated for transmitting the response to the random access in case that the random access identification information received is stored while being correlated with the mobile station device identification information; and allocating and transmitting the random access response information based on said determination.

7. A communication method for base station device, wherein the base station device performs wireless communication with a mobile station device, the communication method comprising:

storing random access identification information and mobile station device identification information correlated with the random access identification information, wherein the random access identification information being allocated by the base station device to the mobile station device and the mobile station device identification information identifying the mobile station device;

receiving random access identification information transmitted by the mobile station device having performed random access;

determining, based on the number of pieces of random access response information to be simultaneously transmitted, whether to transmit random access response information that is a response to the random access corresponding to the random access identification information received from the mobile station device, by using the mobile station device identification information or by using identification information having not been allocated to a specific mobile station device and being allocated for transmitting the response to the random access in case that the random access identification information received is stored while being correlated with the mobile station device identification information; and allocating and transmitting the random access response information based on said determination.

8. The communication method according to claim 7, further comprising:

using the mobile station device identification information allocated to the mobile station device that is a destination for transmitting one of the pieces of random access response information which is the response to the random access corresponding to said stored random access identification information and using the identification information for transmitting remaining pieces of the pieces of random access response information in case that the number of pieces of random access response information to be simultaneously transmitted which is divided by the number of pieces of random access response information that can be allocated in one random access response leaves a remainder of 1.

9. A communication method for a mobile station device, wherein the mobile station device performs wireless communication with a base station device, the communication method comprising:

transmitting random access identification information; and monitoring identification information and mobile station device identification information in case that the mobile station device has transmitted, by performing random access, the random access identification information specified by the base station device, wherein the random access identification information being used for identifying the random access performed by the mobile station device, the identification information having not been allocated to a specific mobile station device and the identification information being allocated for transmitting a response to the random access performed by the mobile station device, and the mobile station device identification information being allocated to the mobile station device.

* * * * *